Figure 1:
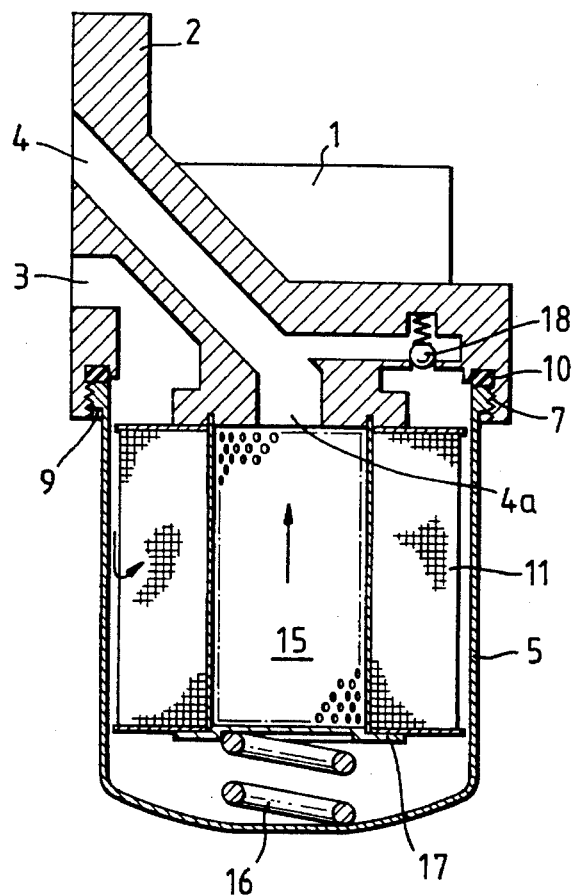

United States Patent [19]
Mules

[11] Patent Number: 5,584,987
[45] Date of Patent: Dec. 17, 1996

[54] FLUID FILTER ASSEMBLIES

[75] Inventor: Robert S. Mules, Talbot Green, Wales

[73] Assignee: AlliedSignal, Inc., Morristown, N.J.

[21] Appl. No.: 524,320

[22] Filed: Sep. 6, 1995

Related U.S. Application Data

[63] Continuation of Ser. No. 209,293, Mar. 10, 1994, abandoned.

[30] Foreign Application Priority Data

Mar. 17, 1993 [GB] United Kingdom .................. 9305455
Apr. 16, 1993 [GB] United Kingdom .................. 9307889

[51] Int. Cl.$^6$ ................................................. B01D 35/147
[52] U.S. Cl. ..................... 210/130; 210/136; 210/352; 210/440; 210/450; 210/453
[58] Field of Search ................................. 210/130, 136, 210/437, 440–444, 450, 453, 487, 489, 493.2, DIG. 17, 451, 457, 352

[56] References Cited

U.S. PATENT DOCUMENTS 2,980,257  4/1961  Paton ...................................... 210/444
3,333,703  8/1967  Scavuzzo et al. ................ 210/DIG. 17
5,374,355  12/1994  Habiger et al. ........................ 210/440

FOREIGN PATENT DOCUMENTS

0547291A1  6/1993  European Pat. Off. ..
1430062  10/1988  U.S.S.R. ................................ 210/130

Primary Examiner—Matthew O. Savage
Attorney, Agent, or Firm—Howard Massung; Gus Hampilos

[57] ABSTRACT

An oil filter assembly for an internal combustion engine includes a body (31) which provides inflow and delivery passages and an attachable filter element container (45) which is attached to the body by a screw-thread at its open end to enclose a cylindrical pleated paper filter element (41) which is located by a perforated support tube (35) carried by the main body, the filter element (35) is sealed at one end against the body and is axially positioned by a spring (38) acting between the closed end of the container and a disc-like closure member (42) which thereby maintains engagement between one end of the filter element and the main body and sealing closure of the other end of the filter by the closure member sealing, the radial and axial compression of the filter element being limited by the support tube.

8 Claims, 3 Drawing Sheets

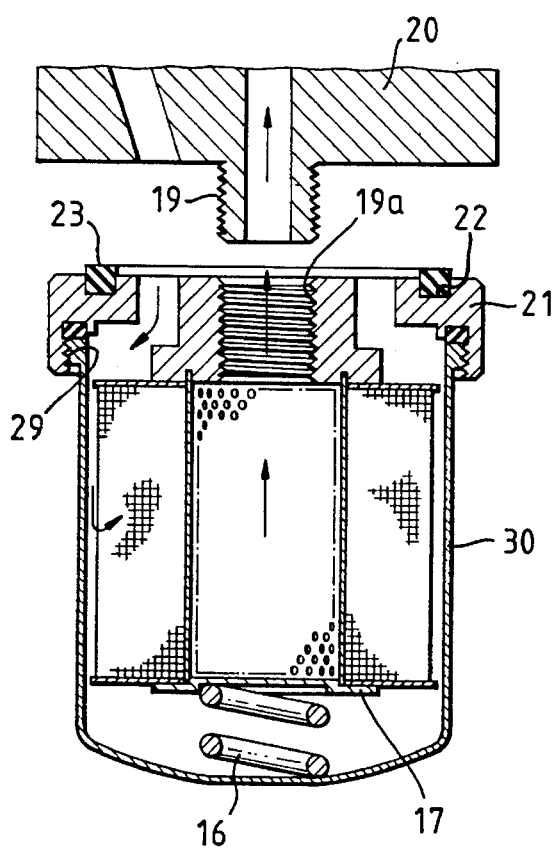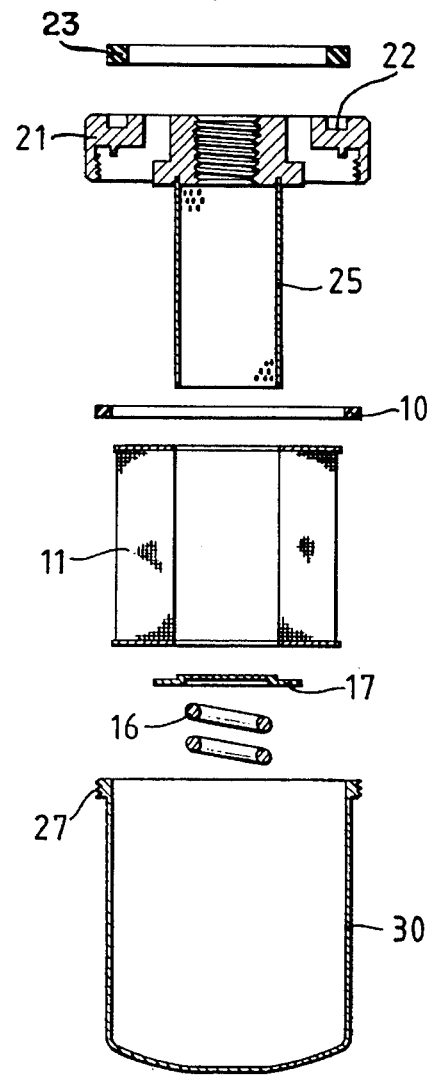

FLUID FILTER ASSEMBLIES

This application is a continuation of application Ser. No. 08/209,293, filed Mar. 10, 1994, now abandoned.

This invention relates to fluid filter assemblies and relates especially but not exclusively to oil filter assemblies for filtering the lubricating oil of an internal combustion engine.

A now-familiar construction of a fluid filter for an internal combustion engine comprises a main metal casting having a flat face which provides an annular sealing surface. Concentric with said sealing surface a screw-threaded tubular spigot projects out of the plane of the surface the interior of the spigot providing communication to an oil delivery passage. Between the spigot and the annular sealing surface further ports are provided which provide communication from an oil inlet passage. A generally cylindrical pleated paper filter element is housed in a metal container having a threaded aperture of a surface at one end to receive the threaded spigot and a peripheral annular seal which is clamped between the main body and the container. Oil flows from the inlet passage into the container and then inwards through the filter element to the delivery passage via the central passage. Usually the container is metal and the filter element itself is built in such a way that it is inaccessible. Moreover the filter element itself often is provided with metal components such as a centre tube, pleat fastenings and end plates.

There is now a desire in the motor car industry to encourage the use of disposable filters of which the component parts can be separately recycled or disposed of and dismantling of used spin-on cartridges of filter assemblies such as outlined above can be tedious and even very difficult for many people.

It is therefore an object of the present invention to provide an improved low cost fluid filter assembly which not only offers ease of servicing but also permits easy separation of different materials for disposal or recycling.

It is an object of a further aspect of the invention to provide means whereby existing filter assemblies may utilise the present invention.

According to the present invention there is provided a fluid filter assembly comprising a body which defines fluid inflow and fluid delivery passages said body being provided with attachment means to sealingly but detachably receive an open end of a container for a generally cylindrical disposable filter element said element permitting fluid flow between one of said passages and the interior of the container and means including resiliently compressible means to locate said filter element within said container to constrain fluid flow between said passages to flow via said filter element characterised in that said main body has attachment means cooperable with attachment means of the open end of the container and a filter support tube located at one end by said main body and by which the filter is supported said support tube limiting radial and axial deformation of the filter element.

In an example where fluid flow through the filter is from outside to inside said support tube is preferably internal to the filter such as to limit inward distortion of the filter element under fluid pressure acting radially inwards.

Preferably said filter element is formed entirely of a combustible or readily degradable material such as pleated resin impregnated paper.

In accordance with a further aspect of the invention, said main body may comprise an adaptor or base portion whereby a body designed to receive a known disposable spin-on filter cartridge is adaptable to receive a serviceable to an assembly in accordance with the invention.

Figure 2:
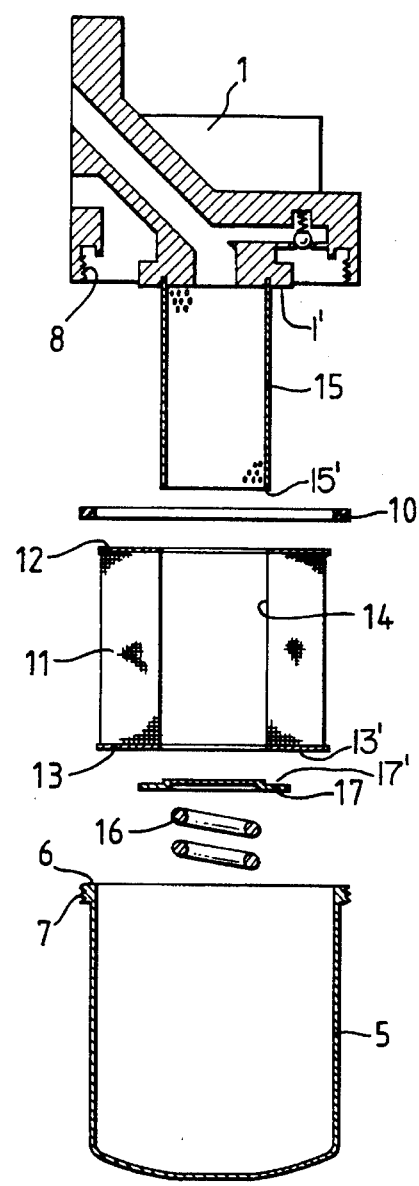
Figure 5:
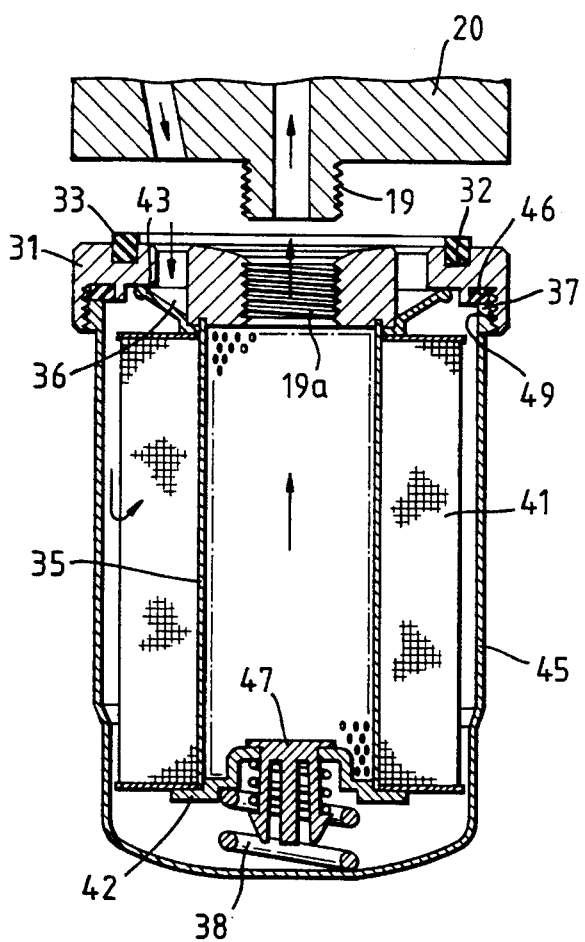
Figure 6:
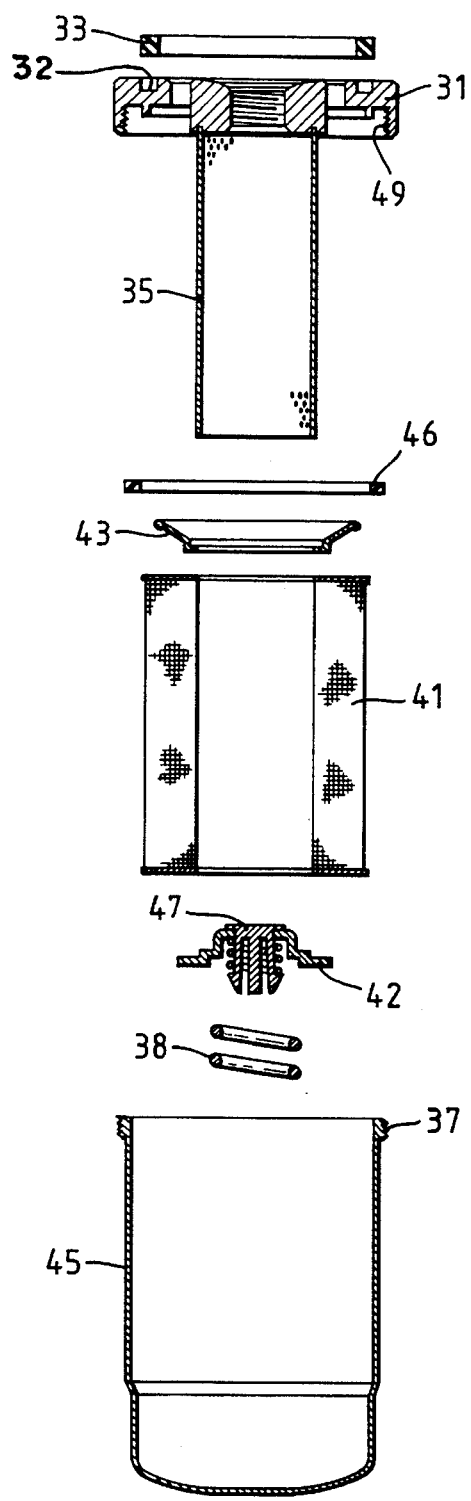

In order that the present invention may be clearly understood and readily carried into effect the invention will now be further described by way of examples with reference to the accompanying drawings of which:

FIG. 1, illustrates in sectional diagrammatic manner a lubricating oil filter assembly in accordance with one embodiment, FIG. 2, illustrates on a smaller scale an exploded view of the separable component of FIG. 1, FIG. 3, illustrates in sectional diagrammatic manner part of a lubricating oil filter assembly which may be employed to adapt a known main filter assembly body to an assembly in accordance with an additional concept of the invention, FIG. 4, illustrates on a smaller scale an exploded view of the separable components of FIG. 3, FIG. 5, illustrates a further filter assembly and FIG. 6, illustrates an exploded view of the components of the assembly of FIG. 5.

Referring to FIG. 1 and FIG. 2, the oil filter assembly shown in this example comprises a main body 1 which may be integral with the cylinder block of an internal combustion engine or may be provided with a flange 2 for mounting to the engine by bolts through the intermediary of a gasket.

The main body 1 has inflow and delivery passages 3 and 4 respectively providing separate fluid communication between the cylinder block and a filter chamber defined by a generally cylindrical filter element container 5 and the main body. The container 5 has an open end presenting a narrow annular flange 6 which locates a close fitting externally screw-threaded attachment ring 7. This ring is typically fixed in position by spot welding an epoxy adhesive or other means. The main body 1 is provided with an annular skirt portion which is formed with a complimentary matching internal screw-thread 9 to receive the screw-thread 8 of ring 7. Screwing of the container thus wise into the main body sealingly traps an annular elastomer gasket 10 in position.

The container 5 houses a disposable cylindrical filter element of generally known configuration, formed of axially pleated impregnated paper. The ends of the pleats are sealed by similarly impregnated annular cardboard end pieces 12, 13 bonded thereto. The filter element 11 therefore presents filter pockets between successive pleats to the inflow passage 3. The internal diameter defined by the inner pleat edges 14 is a close fit on a perforated metal support tube 15 attached at one end to the main housing, the interior of the tube 15 communicating directly with the delivery passage 4. The tube 15 is preferably fixedly located in a groove formed in an annular flat surface 1' of the body 1. The filter element 11 is retained in position by a compression spring 16 which is trapped between the closed end of the container 5 and a shaped disc-like closure plate 17. The plate 17 includes a flat annular surface 17' bearing against the outer end 13' of the filter element 11 and engages and closes the outer end 15' of the tube 15. The length of the tube 15 as measured axially from the flat annular surface 1' of the body 1 to an outer end 15' of the tube 15 is such as to allow a sufficient degree of axial compression of the filter element to effect face-to-face sealing of the ends of the filter against oil flow other than through the filter material, in this case the paper of the pleats. Axial and radial compression of the paper element are limited by the support tube. A suitable bypass check valve 18 is provided in the main housing to protect the system against excessive inflow pressure or interruption of oil flow by blockage of the filter.

If desired the assembly of FIGS. 1 and 2 may include flow-back prevention such as is provided by element 43 to be referred to with reference to FIGS. 5 and 6 and possible although not shown, a flow-back prevention valve may also be included in the lower end 4a of delivery passage 4.

Such a filter assembly requires the filter element 11 to be replaced at specified service intervals and this is easily achieved by unscrewing the container 5 from the internal screw-thread 9 of the body 1. The internal components of the filter can then be withdrawn from tubes 15 and the gasket 10 and filter element 11 may be disposed of and replaced with new parts after cleaning the remaining parts before reassembling.

Referring now to FIGS. 3 and 4, the main body of an existing or known filter assembly designed with a threaded spigot 19 to receive a spin-on disposable filter cartridge is represented at 20. Such a disposable filter cartridge (not shown) contains a number of different materials which are not readily recoverable for re-use or disposal as the case may be. In accordance with the concept of the present invention, the spin-on filter cartridge can be made readily serviceable by an additional generally disc shaped casting 21 which has an annular groove 22 on one end to receive an annular elastomeric seal 23 and a central internally screw-threaded through-bore 19a to be received by the existing threaded spigot 19 of the body 20. The other side of the adaptor 21 is identical to the assembly of FIG. 1 to the extent that it carries a centre tube 25, has inflow and delivery passages which communicate with those of the supporting body 20 and a support tube 25 the same as perforated tube 15 (FIG. 2) to receive a filter element 11. The adaptor also has a corresponding internally screw-threaded part 29 to receive the threaded annular part 27 of the filter element container 30.

Servicing the filter assembly of FIG. 3 is effected identically to that described above with reference to FIG. 2. Alternatively, the complete assembly of casting 21 and container 30 may first be removed before dismantling to insert a replacement filter element 11.

Referring now to FIGS. 5 and 6, in accordance with the concept of the present invention described with reference to FIGS. 3 and 4, a disc shaped casting which has an annular groove 32 on one end to receive an annular elastomeric seal 33 and a central internally screw-threaded through-bore 19a to be received by the existing threaded spigot 19. The other side of the body 31 is identical to the assembly of FIG. 1 to the extend that it carries a centre tube 35. It also has inflow and delivery passages 36 and 37 respectively which communicate with those of the supporting body 20 and the perforated support tube 35 and receives a disposable pleated paper filter element 41. Part 31 also has a corresponding screw-threaded part 49 to receive the threaded annular part 37 of a filter element container which screws into place against an elastomeric annular seal 46.

The inner perforated support tube 35 is again preferably fixedly located in an annular groove of the body part 31. The filter element 41 is a good sliding fit thereon and traps an elastomeric annular gasket 43 the other periphery of which rests resiliently against an internal annular face of the body to cover the inflow port whilst permitting forward flow 43 therefore prevents drain-back.

The filter element 41 is retained in position axially by the action of a compression spring 38 acting thereon via a closure plate 42 which provides face-to-face contact seal with the end disc of the filter element and carries a moulded plastic pressure relief valve 47. The latter enabling oil flow past the filter element 41 in the event of blockage thereof.

In order to adapt a known spin-on filter assembly to use with a serviceable cartridge, the known spin-on cartridge is simply replaced by an assembly such as shown in FIG. 5, which is screwed into place compressing the seal ring 33 into annular groove 32. Thereafter, servicing of the filter assembly is achieved by unscrewing the assembly from the body 20, removing the filter element replacing it with a new one and refitting. The removed filter element, being formed entirely of impregnated pleated paper and cardboard ends is readily disposable by burning. The filter is then reassembled after replacing the elastomeric seal 46 and replacing the container 45.

If desired, the base 31 may be left on the body 20 during servicing and in that case, in order to prevent the seal 33 between the base 21 (FIG. 3) or base 31 (FIG. 5) and the filter body 20 being disturbed during servicing the latter may be provided with means for preventing relative rotation. Alternatively or additionally, the screw-threads such as 49 and 37 may be oppositely handed so that unscrewing of the filter container 45 tends only to tighten the seal between the adaptor and the main body.

In the above described embodiments of the invention, the support tube 15 or 25 or 35 is located to act internally of the filter element and is attached to the main body. In an alternative the support tube may be detachable from the main body, which is the simply provided with means for locating the support tube within the container 5.

In the foregoing descriptions the assembly is designed to provide for oil flow to take place inwardly through the filter element and the support tube 15, 25 or 35 is located internally to resist radially inward deformation and axial deformation of the filter element due to the pressure differential across it and/or spring force as the case may be. In an alternative it may be arranged that a support tube is included as an external support. This may be included alternatively or additionally to an internal support component. In this case the diameter of the member such as 42 against which the compression spring acts may be slightly larger than the diameter of the support tube. The provision of such a close fitting support tube externally of the filter element may be particularly suitably provided in a case where the oil flow is in the outward direction through the filter element, to resist outward deformation as well as axial deformation of the pleated paper filter element.

In alternative embodiments of filter assemblies according to the invention, alternative attachment means for the serviceable container to the main body casting may be adopted. For example an internal screw-threaded rim may be provided at the open end of the container which cooperates with an external thread provided on the main body. Again, a bayonet fixing may be provided or an external clamp ring or clips may be adopted if desired.

I claim:

1. An oil filter assembly for use with a vehicle engine comprising:

a body mountable to said vehicle engine, said body having fluid inflow passage and fluid delivery passage for connection to said vehicle engine;

a generally cylindrical container having an interior, an open end and a closed end;

means on said body and said container for releasably securing said open end of said container on said body, said inflow and fluid delivery passages opening into the interior of said container when the container is secured to said body, said delivery passage being located substantially on a central axis of said cylindrical container, said body having a flat annular surface coaxially surrounding an opening of said fluid delivery passage, and an axially extending annular groove formed in said annular surface coaxially surrounding the opening of said fluid delivery passage;

a perforated support tube having a first end and a second end, said first end;

means for fixedly attaching said first end of said support tube within said annular groove to extend therefrom into the interior of said cylindrical container along the axis thereof, said first end of said support tube being fluidly connected to said delivery passage;

an annular filter element mounted within the interior of said container, said filter element having a first end and a second end, said filter element closely surrounding said support tube;

a closure member engaging said second end of said filter element and closing the second end of said support tube; and spring means disposed within said cylindrical container and between the closed end of said cylindrical container and said closure member, said spring means axially urging said closure member firmly into engagement with said second end of said filter element to axially compress said filter element and axially urge the first end of said filter element into sealing contact with a portion of said flat annular surface located radially outwardly of said support tube.

2. An oil filter assembly for use with a vehicle engine, said vehicle engine having an outflow passage and an adjacent externally screw threaded oil return spigot, said assembly comprising:

a generally disc shaped body having a central axially extending internally screw threaded through bore for threadedly engaging said spigot, said body having oil inflow bore means axially alignable with said oil outflow passage when said disc shaped body is fully threadedly engaged on said spigot;

a generally cylindrical container having an interior, an open end and a closed end;

means on said body and said container for releasably securing said open end of said container on said body, said inflow and fluid delivery passages opening into the interior of said container when it is secured to said body, said delivery passage being located substantially on a central axis of said substantially cylindrical container, said body having a flat annular surface coaxially surrounding an opening of said fluid delivery passage, and an axially extending annular groove formed in said annular surface coaxially surrounding the opening of said fluid delivery passage;

a perforated support tube having a first end and a second end;

means for fixedly attaching said first end within said annular groove to extend therefrom into the interior of said substantially cylindrical container along the axis thereof, said first end of said support tube being fluidly connected to said internally screw threaded bore;

an annular filter element mounted within the interior of said container, said filter element having a first end and a second end, said filter element closely surrounding said support tube;

a closure member engaging said second end of said filter element and closing the second end of said perforate support tube; and spring means disposed within said generally cylindrical container and engaging between the closed end thereof and said closure member, effective to axially urge said closure member firmly into engagement with said second end of the filter element to axially compress said filter element and axially urge said first end of said filter element into sealing contact with a portion of said flat annular surface located radially outwardly of said support tube.

3. The oil filter assembly for a vehicle engine as claimed in claim 2, wherein said closure member comprises a pressure relief valve normally closing said second end of said perforated support tube, but allowing flow from an area adjacent said closed end of said container in the event that oil pressure therein exceeds a predetermined value.

4. The oil filter assembly for a vehicle engine as claimed in claim 2, and further comprising an elastomeric annular gasket sealingly interposed between said flat annular surface of said body and said first end of said filter element, and extending across said oil inflow bore means for sealing engagement with said body outwardly of said bore means, said elastomeric gasket normally flexing to allow inflow of oil from the inflow bore means into the interior of the container but acting as a non-return valve preventing oil from flowing from the interior of said container into said inflow bore means.

5. An oil filter assembly for use with a vehicle engine comprising:

a body mountable to said vehicle engine, said body having fluid inflow passage and fluid delivery passage for connection to said vehicle engine;

a generally cylindrical container having an interior, an open end and a closed end;

means on said body and said container for releasbly securing said open end of said container on said body, said inflow and fluid delivery passages opening into the interior of said container when the container is secured to said body, said delivery passage being located substantially on a central axis of said cylindrical container, said body having a flat annular surface coaxially surrounding an opening of said fluid delivery passage;

a perforated support tube having a first end and a second end;

means for fixedly attaching said first end of said support tube directly to said body so as to be integral therewith and to extend therefrom into the interior of said cylindrical container along the central axis thereof, said first end of said support tube being fluidly connected to said delivery passage, said perforated support tube having a predetermined foxed axial length as measured axially from said flat annular surface of said body to said second end of said support tube;

an annular filter element mounted within the interior of said container, said filter element having a first end and a second end, said filter element closely surrounding said support tube, said filter element having an axial length slightly greater than said fixed length of said support tube;

a closure member defining a flat annular surface engaging said second end of said filter element and engaging and closing the second end of said support tube; and spring means disposed within said cylindrical container and between the closed end of said cylindrical container and said closure member, said spring means axially urging said closure member firmly into engagement with said second end of said filter element and said second end of said perforated support tube to axially compress said filter element and axially urge the first end of said filter element into sealing contact with a portion of said flat annular surface located radially outwardly of said support tube, said support tube being effective to limit axial and radial compression of said filter element.

6. An oil filter assembly for use with a vehicle engine, said vehicle engine having an outflow passage and an adjacent externally screw threaded oil return spigot, said assembly comprising:

- a generally disc shaped body having a central axially extending internally screw threaded through bore for threadedly engaging said spigot, said body having oil inflow bore means axially alienable with said oil outflow passage when said disc shaped body is fully threadably engaged on said spigot;
- a generally cylindrical container having an interior, an open end, and a closed end;
- means on said body and said container for releasably securing said open end of said container on said body, said inflow and fluid delivery passages opening into the interior of said container when it is secured to said body, said delivery passage being located substantially on a central axis of said substantially on a central axis of said substantially cylindrical container, said body having a flat annular surface coaxially surrounding an opening of said fluid delivery passage;
- a perforated support tube having a first end and a second end;
- means for fixedly attaching said first end of said support tube directly to said body so as to be integral therewith and to extend therefrom into the interior of said substantially cylindrical container along the central axis thereof, said first end of said support tube being fluidly connected to said internally screw threaded bore, said perforated support tube having a predetermined fixed axial length as measured axially from said flat annular surface of said body to said second end of said support tube;
- an annular filter element mounted within the interior of said container, said filter element having a first end and a second end, said filter element closely surrounding said support tube, said filter element having an axial length slightly greater than said fixed axial length of said perforated support tube;
- a closure member defining a flat annular surface engaging said second end of said filter element and engaging and closing the second end of said perforate support tube; and
- spring means disposed within said generally cylindrical container and engaging between the closed end thereof and said closure member, effective to axially urge said closure member firmly into engagement with said second end of the filter element and said second end of said perforated support tube to axially compress said filter element and axially urge said first end of said filter element into sealing contact with a portion of said flat annular surface located radially outwardly of said support tube, said support tube being effective to limit axial and radial compression of said filter element.

7. The oil filter assembly for a vehicle engine as claimed in claim 6, wherein said closure member comprises a pressure relief valve normally closing said second end of said perforated support tube, but allowing flow from an area adjacent said closed end of said container in the event that oil pressure therein exceeds a predetermined value.

8. The oil filter assembly for a vehicle engine as claimed in claim 6, and further comprising an elastomeric annular gasket sealingly interposed between said flat annular surface of said body and said first end of said filter element, and extending across said oil inflow bore means for sealing engagement with said body outwardly of said bore means, said elastomeric gasket normally flexing to allow inflow of oil from the inflow bore means into the interior of the container but acting as a non-return valve preventing oil from flowing from the interior of said container into said inflow bore means.

* * * * *